United States Patent [19]
Horiguchi et al.

[11] Patent Number: 5,191,478
[45] Date of Patent: Mar. 2, 1993

[54] ZOOM LENS FOR VIDEO CAMERA

[75] Inventors: Shuuichi Horiguchi, Yokohama; Osamu Uchida, Atsugi, both of Japan

[73] Assignee: Matsushita Electric Industrial Co., Ltd., Osaka, Japan

[21] Appl. No.: 829,237

[22] Filed: Feb. 3, 1992

[30] Foreign Application Priority Data

Feb. 12, 1991 [JP] Japan .................................. 3-018604

[51] Int. Cl.$^5$ .......................... G02B 7/02; G02B 15/14
[52] U.S. Cl. ..................................... 359/703; 359/694; 359/823; 359/825
[58] Field of Search ............... 359/700, 701, 704, 823, 359/825, 694, 822, 703, 699; 354/195.1, 195.12

[56] References Cited

U.S. PATENT DOCUMENTS

| | | | |
|---|---|---|---|
| 4,114,984 | 9/1978 | Muryoi | 359/700 X |
| 4,333,712 | 6/1982 | Tomori | 359/700 X |
| 4,334,737 | 6/1982 | Nozawa et al. | 359/700 X |
| 4,488,787 | 12/1984 | Osawa | 359/700 X |
| 4,759,618 | 7/1988 | Kamata | 359/700 X |

FOREIGN PATENT DOCUMENTS 6316721 8/1984 Japan .
63-41041 4/1988 Japan .

Primary Examiner—Bruce Y. Arnold
Assistant Examiner—David R. Parsons
Attorney, Agent, or Firm—Stevens, Davis, Miller & Mosher

[57] ABSTRACT

A zoom lens for a video camera includes a focusing mechanism which is designed to prevent a picked-up image from shaking when the focusing mechanism is operated manually or electrically. In the focusing mechanism, a female helicoid is threadedly fitted on a male helicoid, and a female helicoid holder supports the female helicoid from a lower side of the female helicoid to maintain a proper threaded engagement between the female helicoid and the male helicoid. The female helicoid holder is provided at a lower side of the male helicoid.

3 Claims, 3 Drawing Sheets

ZOOM LENS FOR VIDEO CAMERA

BACKGROUND OF THE INVENTION

1. Field of the Invention

This invention relates to a video camera zoom lens used in a video movie, a monitoring video camera or the like.

2. Description of the Prior Art

A general construction of a focusing mechanism in a conventional video camera zoom lens of this type is shown in FIGS. 1 and 2.

In the conventional construction shown in FIGS. 1 and 2, a male helicoid 1 is fixedly mounted on a lens mount 2, and has a male helicoid screw (thread) portion 1a formed on an outer peripheral surface of a front portion thereof A female helicoid 3 supports a focusing lens 4 within a front portion thereof, and has a female helicoid screw (thread) portion 3a formed on an inner peripheral surface of a rear portion thereof The female helicoid screw portion 3a of the female helicoid 3 is threaded on the male helicoid screw portion 1a of the male helicoid 1 so that the female helicoid 3 can be moved back and forth so as to effect the focus adjustment.

Therefore, in such a threaded condition, the female helicoid 3, because of its dead-weight a, is decentered downward with respect to the male helicoid 1 by an amount corresponding to a gap between the threaded helicoid screw portions 1a and 3a. Thus, the amount (−b) of decentering between the male and female helicoids 1 and 3 is produced, and a supporting point c for this threaded connection lies at the upper section of the male helicoid 1 threadedly engaged with the female helicoid 3.

In the above conventional focusing mechanism in which the female helicoid screw portion 3a is threaded on the male helicoid screw portion 1a of the male helicoid 1, when the focus adjustment is to be effected, the lower portion of the female helicoid 3 is angularly moved (or screwed) manually as at d or by a focus motor e, so that the focusing lens 4 is moved back and forth by this angular movement (screwing motion).

However, in the conventional focusing mechanism of the above construction for the video camera zoom lens, when the focus adjustment is to be effected manually, the female helicoid 3 is first lifted by hand from the lower side thereof and is angularly moved, because the thread supporting point c supporting the female helicoid 3 lies at the upper side, with the decentering amount (−b) produced between the male helicoid 1 and the female helicoid 3. Then, after the focus adjustment is finished, the hand is released from the female helicoid 3. Therefore, during this operation, the female helicoid 3 and hence the focusing lens 4 are moved upward and downward, and as a result the picked-up image shakes upward and downward (that is, undergoes pitching). In the case of the electrical operation for the focus adjustment, similarly, the thread supporting point c supporting the female helicoid 3 lies at the upper side, with the decentering amount (−b) produced between the male helicoid 1 and the female helicoid 3), and the torque operating point by the focus motor e is usually disposed at the lower side, and therefore the focusing lens 4 is swung right and left like a pendulum during the time from the start of the rotation of the motor e to the end of the rotation of this motor. As a result, the picked-up image shakes right and left (that is, undergoes rolling).

Thus, the above undesirable problems are encountered in manual operation and electrical operation.

Further, when the supporting point c for the threaded connection is disposed at the upper side with respect to the male helicoid 1, the focusing lens 4 is swung right and left like a pendulum from the start of the rotation of the motor e to the end of the rotation of this motor even if an actuating point of the torque provided by the focus motor e is disposed at any position. Thus, undesirable problems are encountered in the above operations as well.

SUMMARY OF THE INVENTION

With the above problems of the prior art in view, it is an object of this invention to provide a focusing mechanism of a video camera zoom lens which can prevent shaking of a picked-up image during a manual operation or an electrical operation.

To achieve the above object, according to the present invention, there is provided a video camera zoom lens including a focusing mechanism in which a female helicoid is threadedly connected to a male helicoid, and a female helicoid holder for maintaining the threaded condition of the female helicoid is provided on the male helicoid, thereby preventing the female helicoid from shaking relative to the male helicoid due to a gap (clearance) between the threaded male and female helicoids.

More specifically, in the focusing mechanism, the female helicoid, supporting a focusing lens within it, is threadedly fitted on the male helicoid, and the female helicoid is angularly moved relative to the male helicoid so as to effect a focus adjustment. The female helicoid holder, which supports the female helicoid from the lower side of the female helicoid so as to maintain the threaded condition of the female helicoid, is provided at the lower side or the male helicoid.

Therefore, due to the provision of the female helicoid holder for maintaining the threaded condition of the female helicoid, when the female helicoid is angularly moved manually or electrically so as to effect the focus adjustment, the female helicoid will not shake relative to the male helicoid, and therefore a picked-up image will not be subjected to an unnatural shaking.

DESCRIPTION OF THE PREFERRED EMBODIMENT

A focusing mechanism of a video camera zoom lens according to the present invention will now be described with reference to FIGS. 3A, 3B, 4 and 5.

Figure 3A:
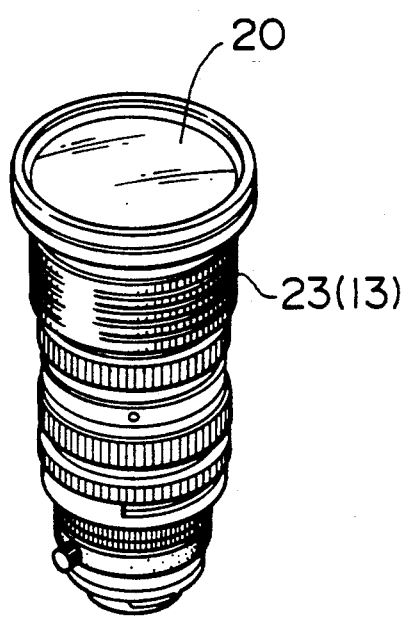
FIG. 3A is a perspective view of a video camera zoom lens according to one preferred embodiment of the present invention.
Figure 3B:
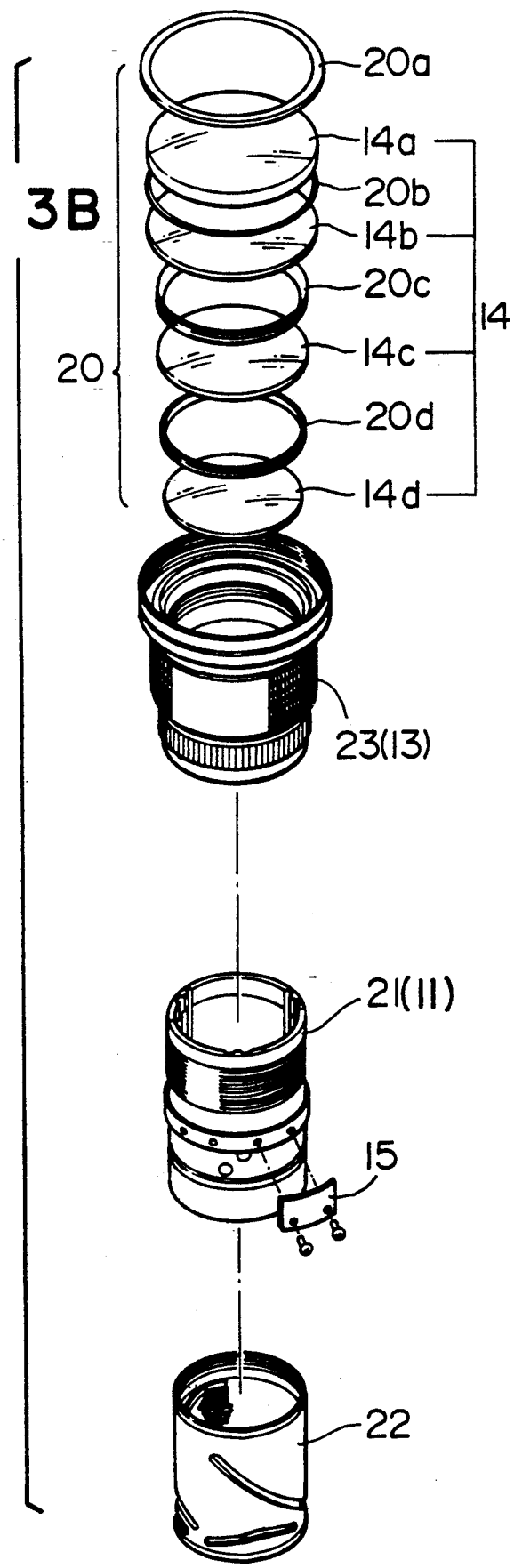
FIG. 3B is an exploded perspective view of the video camera zoom lens of FIG. 3A.
Figure 4:
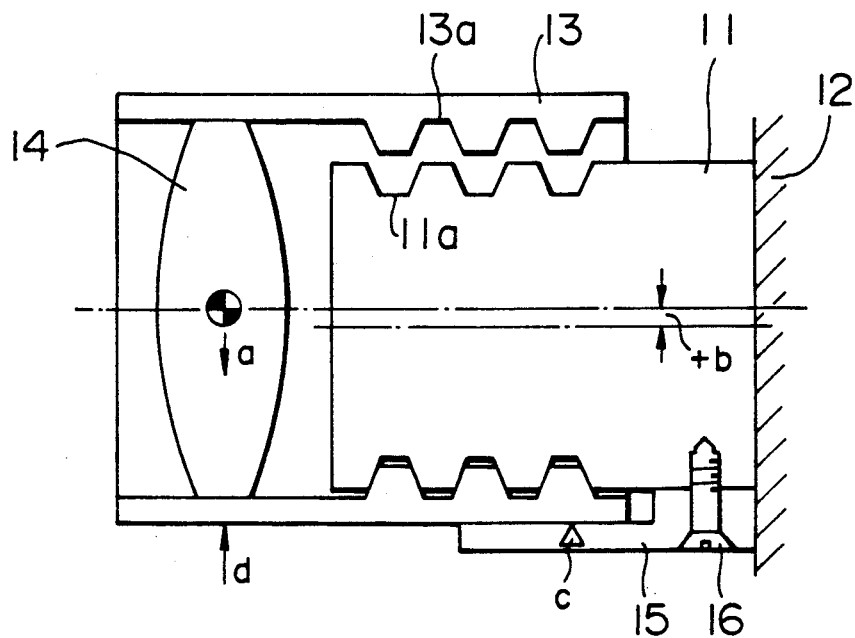
FIG. 4 is a longitudinal cross-sectional view, schematically showing a general construction of a focusing mechanism of the video camera zoom lens of FIG. 3A.
Figure 5:
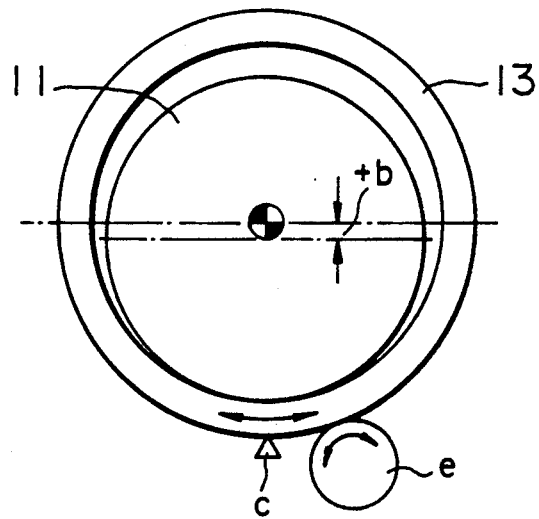
FIG. 5 is a transverse cross-sectional view showing the operation of the focusing mechanism of FIG. 4.

FIG. 3A is a perspective view of the video camera zoom lens of the present invention, and FIG. 3B is an exploded perspective view of the video camera zoom lens, and FIG. 4 is a longitudinal cross-sectional view, schematically showing a general construction of a focusing mechanism of the video camera zoom lens, and FIG. 5 is a transverse cross-sectional view showing the operation of the focusing mechanism.

As shown in FIGS. 3A and 3B, the video camera zoom lens of the present invention comprises a group of lenses 20, a focus ring 23, a body tube 21, a helicoid holder 15, and a cam tube 22. The lens group 20 comprises a focusing lens 14 constituted by separate lenses 14a, 14b, 14c and 14d assembled together, junk rings 20a and 20d, and spacer rings 20b and 20c, these rings 20a to 20d holding the separate lenses 14a to 14d. The focus ring 23 is provided with a female helicoid 13 of the focusing mechanism, and similarly the body tube 21 includes a male helicoid 11 of the focusing mechanism. The cam tube 22 has a zoom lens and a zooming function.

The focusing mechanism of the zoom lens will now be described with reference to FIGS. 4 and 5.

Figure 1:
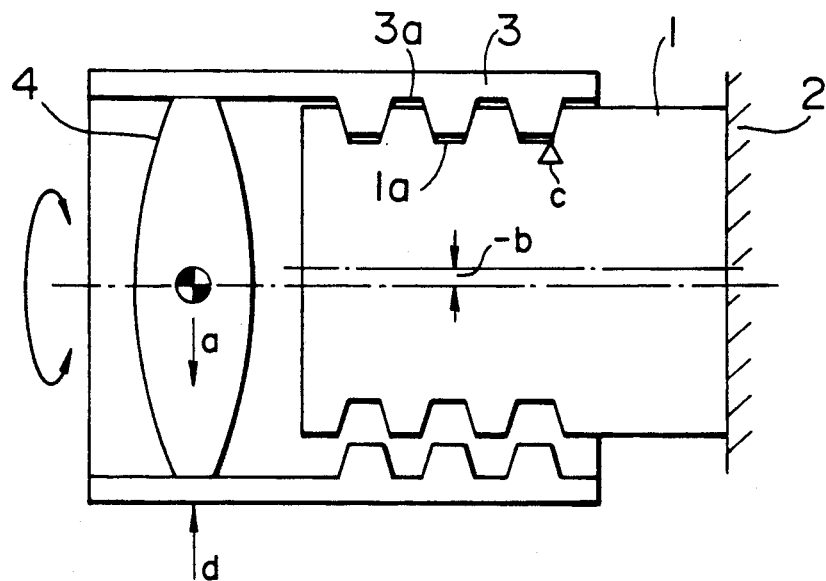
FIG. 1 is a longitudinal cross-sectional view, schematically showing a general construction of the focusing mechanism of the conventional video camera zoom lens.
Figure 2:
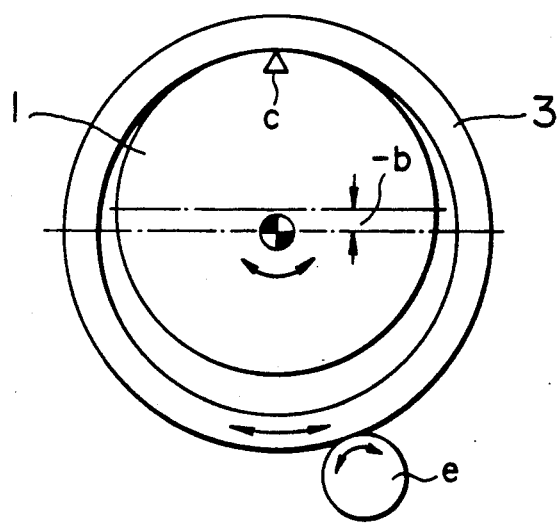
FIG. 2 is a transverse cross-sectional view showing the operation of the conventional focusing mechanism.

In FIGS. 4 and 5, as in FIGS. 1 and 2 showing the prior art, the male helicoid 11 is fixedly mounted on a lens mount 12, and has a male helicoid screw (thread) portion 11a formed on an outer peripheral surface of a front portion thereof. The female helicoid 13 supports the focusing lens 14 within a front portion thereof, and has a female helicoid screw (thread) portion 13a formed on an inner peripheral surface of a rear portion thereof. The female helicoid screw portion 13a of the female helicoid 13 is threadedly fitted on the male helicoid screw portion 11a of the male helicoid 11 so that the female helicoid 13 can be moved back and forth so as to effect the focus adjustment. The female helicoid holder (female helicoid holder means) 15 is fixedly secured by fixing screws 16 to the lower side of the male helicoid 11, and holds or supports the female helicoid 13 (which is threaded on the male helicoid 11) from the lower side thereof, thereby maintaining the threaded condition thereof.

Therefore, in this threaded condition, in contrast with the above-mentioned prior art, the female helicoid 13 is decentered upward with respect to the male helicoid 11 by an amount corresponding to a gap between the threaded helicoid screw portions 11a and 13a. Thus, the amount (+b) of decentering between the male and female helicoids 11 and 13 is produced, and a supporting point c for this threaded connection lies at the lower section of the female helicoid 13 which is threadedly engaged with the male helicoid 11 and is supported by the female helicoid holder 15 from below. Also, the dead-weight a of the female helicoid 13 is supported by the female helicoid holder 15.

Since the dead-weight a acts in the direction of the threaded portion, the threaded condition is maintained quite satisfactorily.

As described above, in the focusing mechanism of this embodiment, the female helicoid screw portion 13a of the female helicoid 13 is threadedly fitted on the male helicoid screw portion 11a of the male helicoid 11, and the female helicoid holder 15, provided at the lower side of the female helicoid 13, supports the female helicoid 13 from the lower side of the female helicoid 13 to thereby maintain the threaded condition. In this focusing mechanism, also, when the focus adjustment is to be effected, the lower portion of the female helicoid 13 is angularly moved (or screwed) manually as at d or by a focus motor e, so that the focusing lens 14 is moved back and forth by this angular movement (screwing motion).

The construction of this embodiment differs from the above-mentioned prior art construction in that the thread supporting point c for supporting the female helicoid 13 lies at the lower section of the female helicoid 13, and that the female helicoid holder 15 maintains the condition of threaded engagement between the male helicoid 11 and the female helicoid 13 (and hence maintains the amount (+b) of decentering between the male helicoid 11 and the female helicoid 13), and also receives and supports the dead-weight a of the female helicoid 13 to thereby prevent the female helicoid 13 from shaking relative to the male helicoid 11. Therefore, when the focus adjustment is to be effected either manually (as indicated by d) or electrically by the focus motor e, the differential movement between the male helicoid 11 and the female helicoid 13 is suppressed as much as possible, and as a result the upward-and-downward shaking (i.e., pitching) and the right-and-left shaking (i.e., rolling) of the picked-up image can be quite effectively prevented.

In the above embodiment, although the female helicoid holder 15 is fixedly secured to the lower portion of the male helicoid 11, the female helicoid holder 15 may be fixedly secured to the lens mount 12. Also, the female helicoid holder 15 may be formed integrally with the male helicoid 11 or the lens mount 12, in which case the same effect and advantage can be obtained.

What is claimed is:

1. A zoom lens for a video camera comprising a focusing mechanism which comprises:
    a male helicoid;
    a female helicoid threadedly fitted on an inner side of said male helicoid, said female helicoid having a focusing lens; and
    a female helicoid holder means supporting said female helicoid from a lower side of said female helicoid in a dead-weight direction thereof to thereby support the dead-weight of said female helicoid;
    said female helicoid, while supported by said female helicoid holder means from the lower side thereof, being angularly moved relative to said male helicoid so as to effect a focus adjustment.

2. A zoom lens according to claim 1, wherein said female helicoid holder means is mounted on said male helicoid at a mounting position located at a lower side of said male helicoid in a dead-weight direction of said female helicoid.

3. A zoom lens according to claim 1, wherein said female helicoid holder means is mounted on said lens mount at a mounting position located below a lower side of said male helicoid in a dead-weight direction of said lens mount.

* * * * *